US010220861B2

(12) United States Patent
Boukari

(10) Patent No.: US 10,220,861 B2
(45) Date of Patent: Mar. 5, 2019

(54) DEVICE FOR COMMUNICATING AND MONITORING RAILWAY TRACKS AND OPERATING METHOD

(71) Applicants: PRODOSE, Bessieres (FR); Morou Boukari, Toulouse (FR)

(72) Inventor: Morou Boukari, Toulouse (FR)

(73) Assignee: PRODOSE SARL, Bessieres (FR)

( * ) Notice: Subject to any disclaimer, the term of this patent is extended or adjusted under 35 U.S.C. 154(b) by 39 days.

(21) Appl. No.: 14/784,709

(22) PCT Filed: Apr. 14, 2014

(86) PCT No.: PCT/FR2014/050907
§ 371 (c)(1),
(2) Date: Oct. 15, 2015

(87) PCT Pub. No.: WO2014/170592
PCT Pub. Date: Oct. 23, 2014

(65) Prior Publication Data
US 2016/0052531 A1 Feb. 25, 2016

(30) Foreign Application Priority Data
Apr. 16, 2013 (FR) ...................................... 13 53449

(51) Int. Cl.
*B61L 23/04* (2006.01)
*F03D 9/43* (2016.01)
(Continued)

(52) U.S. Cl.
CPC .............. *B61L 23/04* (2013.01); *B61D 43/00* (2013.01); *B61K 9/08* (2013.01); *B61L 23/041* (2013.01);
(Continued)

(58) Field of Classification Search
CPC .. B61L 23/04; B61L 27/0005; B61L 27/0077; B61L 23/041; F03D 13/20;
(Continued)

(56) References Cited

U.S. PATENT DOCUMENTS 914,389 A 3/1909 Davis
5,627,508 A 5/1997 Cooper et al.
(Continued)

FOREIGN PATENT DOCUMENTS

CN 201 925 099 U 8/2011
DE 198 41 246 A1 6/2000
(Continued)

OTHER PUBLICATIONS

International Search Report, dated Jul. 11, 2014 from International Phase of the instant application.

Primary Examiner — Joseph Suh
(74) Attorney, Agent, or Firm — Paul & Paul

(57) ABSTRACT

A device for communicating and monitoring railway tracks includes a plurality of communicating and monitoring terminals arranged along the tracks. Each of the terminals includes an image-capturing module, a wireless communicating module that allows for communication between the terminals and with a train, and a module for storing electrical power continuously supplying the image-capturing module and the communicating module. Each terminal also includes a power-generating module for supplying the module for storing electrical power. The power generating module recovers energy from the air displaced by the train running over the railway track. The device permits permanent monitoring by capturing images and makes permanent wireless connections available to the trains.

20 Claims, 5 Drawing Sheets

(51) Int. Cl.
*B61D 43/00* (2006.01)
*B61K 9/08* (2006.01)
*B61L 27/00* (2006.01)
*H04N 7/18* (2006.01)
*F03D 13/20* (2016.01)
*F03D 9/25* (2016.01)
*F03D 9/11* (2016.01)

(52) U.S. Cl.
CPC ....... *B61L 27/0005* (2013.01); *B61L 27/0077* (2013.01); *F03D 9/43* (2016.05); *F03D 13/20* (2016.05); *H04N 7/183* (2013.01); *F03D 9/11* (2016.05); *F03D 9/25* (2016.05); *F05B 2240/9113* (2013.01); *Y02E 10/728* (2013.01)

(58) Field of Classification Search
CPC .......... B61K 9/08; B61D 43/00; H04N 7/183; Y02E 10/728; F05B 2240/9113
See application file for complete search history.

(56) References Cited

U.S. PATENT DOCUMENTS

| | | | | |
|---|---|---|---|---|
| 8,067,878 B1* | 11/2011 | Lu | ............................ | H02N 2/181 310/339 |
| 2002/0174582 A1* | 11/2002 | Garfinkle | .................. | G09F 3/20 40/607.1 |
| 2003/0023979 A1* | 1/2003 | Emoto | ................... | B61D 49/00 725/75 |
| 2006/0131889 A1* | 6/2006 | Corten | ....................... | F03D 1/04 290/43 |
| 2006/0226224 A1* | 10/2006 | Henry | .................. | G06K 7/0004 235/449 |
| 2007/0040070 A1* | 2/2007 | Stevenson | ............... | B61L 29/30 246/122 R |
| 2007/0146167 A1* | 6/2007 | Miller | .................. | G08G 5/0078 340/963 |
| 2007/0216771 A1* | 9/2007 | Kumar | .................. | B61L 23/044 348/148 |
| 2007/0217670 A1* | 9/2007 | Bar-Am | ................... | B61K 9/08 382/141 |
| 2008/0296904 A1 | 12/2008 | Elahi | | |
| 2009/0162814 A1* | 6/2009 | Swan | ........................ | G09B 9/04 434/69 |
| 2009/0326746 A1* | 12/2009 | Mian | ........................ | B61L 1/165 701/19 |
| 2010/0029268 A1* | 2/2010 | Myer | ........................ | F21S 2/00 455/426.1 |
| 2010/0231687 A1* | 9/2010 | Amory | ................... | H04N 5/232 348/36 |
| 2010/0245563 A1* | 9/2010 | Golovchinsky | .......... | H04N 7/18 348/135 |
| 2011/0084176 A1* | 4/2011 | Reichelt | ................ | B61L 23/041 246/473.1 |
| 2012/0152877 A1* | 6/2012 | Tadayon | .................... | B25J 5/02 212/224 |
| 2013/0018766 A1* | 1/2013 | Christman | ............ | B60L 3/0023 705/34 |
| 2013/0256466 A1* | 10/2013 | Carlson | ..................... | B61L 5/00 246/218 |
| 2013/0264829 A1 | 10/2013 | Jordan | | |
| 2013/0283655 A1* | 10/2013 | Saito | ....................... | B61L 3/125 40/370 |
| 2014/0146231 A1* | 5/2014 | Lin | ....................... | G06F 3/1454 348/554 |
| 2015/0281652 A1* | 10/2015 | Morimoto | ............... | B61L 23/00 348/148 |

FOREIGN PATENT DOCUMENTS

| | | |
|---|---|---|
| DE | 101 51 525 A1 | 4/2003 |
| DE | 10 2005 057273 A1 | 5/2007 |
| DE | 10 2009 008077 A1 | 8/2010 |
| DE | 10 2010 045234 A1 | 3/2012 |
| DE | 10 2010 046153 A1 | 3/2012 |
| EP | 1 106 470 A1 | 6/2001 |
| EP | 1 547 899 A2 | 6/2005 |
| JP | H07 127561 A | 5/1995 |
| WO | WO 2011/050294 A2 | 4/2011 |
| WO | WO 2011/095653 A1 | 8/2011 |
| WO | WO 2011/154347 A2 | 12/2011 |

\* cited by examiner

DEVICE FOR COMMUNICATING AND MONITORING RAILWAY TRACKS AND OPERATING METHOD

FIELD OF APPLICATION OF THE INVENTION

This invention relates to the field of railway tracks and in particular to the adaptations that make it possible to provide a communications service to the users of a train and to provide the monitoring of railway tracks in the best conditions.

DESCRIPTION OF PRIOR ART

In light of the investments required, the wireless communications technology governed by the standards of the IEEE 802.11 (ISO/CEI 8802-11) group (known under the registered trademark of Wi-Fi and hereinafter designated simply under the sign Wi-Fi) is accessible today only to a small number of trains via a very expensive connection that combines satellite, 3G, Wi-Fi and terrestrial wireless. Such installations cannot be extended to the entire railway track network.

In order to carry out the monitoring of railway tracks and in particular high-speed lines, several means are known.

Among these, there is a video surveillance device of which the zones of installation are limited. Indeed, supplying video surveillance stations with electrical power comes up against several difficulties described hereinbelow.

Supplying the entire high-speed line via an electrical network is very expensive and even impossible as it requires setting up high-to-low voltage transformers everywhere with the possibility of a disturbance in the electric voltage. Electrical power supplied by solar panels with an extension to the entire high-speed line is not a priori possible as it would require having sunshine guaranteed everywhere and in all weather conditions.

Electrical power supplied by wind turbines with an extension to the entire high-speed line is also a priori not possible as, as for the preceding solution, it would require having wind guaranteed everywhere and in all weather conditions.

These difficulties constitute the reason for which this video surveillance is today limited to stations and to certain zones such as tunnels and bridges.

As a supplement to this limited video surveillance, it is known that the operator of the high-speed lines runs a train called a sweeper each morning and before the opening of the high-speed lines, with this train running at a low speed (about 160 or 170 km/h) for the purpose of verifying the condition of the railway infrastructures and the absence of obstacles on the tracks.

This surveillance is therefore limited to what can be observed at this speed but also at a one-off moment since there is no monitoring of the track after the passage of the sweeper train.

Another technical problem with which the implementation of a device for monitoring is confronted with relates to the transmission of data able to create an alert, the location of its origin and the communication of it not only to people or to the system in charge of monitoring but also to the conductor of the train.

A partial solution is described in document WO2011154347 which proposes a device for monitoring railway tracks comprising a plurality of monitoring terminals arranged along the tracks, with each terminal able to comprise an image-capturing module and means for transmitting information from one terminal to another of the information detected by the image-capturing modules.

Indeed, in order to require only a small amount of energy for this transmission, this document proposes to have the transmission operate only
  when an emergency situation is detected,
  from one terminal to the other,
  when a vehicle is approaching.

This device and its operating method have for function to propose a monitoring that expends the least amount of power by decreasing the frequency of the transmissions and the distance of the latter. It is not able to provide in association with the monitoring, a service for making a communications network available for the users of the train.

This document proposes means for recovering power for the purposes of supplying terminals in order to implement said method, but these means are not designed or adaptable for continuously supplying a network.

Indeed, the wind turbine means such as those described in document CN201925099 have an optimum output with an air speed between 7 and 10 m/s while the speeds of the air flow measured in the vicinity of TGVs is between 40 and 50 m/s. At this speed, a conventional wind turbine does not have any output or very little. In addition, even at optimum output, the energy demand required by the making available of a permanent communications network for the users of the train is such that a conventional wind turbine device is not sufficient.

BRIEF DESCRIPTION OF THE INVENTION

Observing this, the applicants carried out research aimed at proposing a permanent communications service to the users of a train and improve the monitoring of railway tracks. This research resulted in the design and in the carrying out of an original device, that offers a simple, effective and inexpensive technical solution for continuously monitoring the railway tracks over their entire length and in order to offer communication possibilities that can be used not only for the monitoring but also for the users of the railway track.

According to the invention, this device for communicating and monitoring railway tracks is remarkable in that it comprises a plurality of communicating and monitoring terminals arranged along the tracks, with each terminal comprising:
  an image-capturing module,
  a wireless communication module enabling communication between terminals and with the train,
  a module for storing electrical power continuously supplying the image-capturing module and the communicating module,
  a module for supplying the storing module comprising at least one means for recovering energy from the air displaced by the trains running over the railway track,
for the purposes of monitoring through permanent image capturing and making permanent wireless connections available to trains.

The invention therefore constitutes an autonomous system for monitoring and communicating railway lines supplied by the recovering of the energy lost from the air displaced by trains running over the monitored railway track thanks to a convertor of energy that is actuated not by wind, but by the volume of air that is displaced by the passage of trains.

Indeed, when a train moves, it sets into motion around it a substantial mass of air. The speed of displacement of this mass of air is proportional to the speed of the train. This speed decreases as the distance from the lateral walls of the train increases, moving towards the periphery.

In order to recover the energy contained in this mass of air of which the movement is induced by the passing of the train, at least one means for recovering energy coming from the displaced air is used for each terminal.

According to a particularly advantageous characteristic, said means for recovering is a dynamic air turbine. Such technology is a technology which is today used on aircraft as a backup source of power in the event of a general electric failure. This turbine resists very severe climatic conditions (temperature from −50° C. to +80° C., high wind speed able to reach 200 m/s) and authorizes wind gradients and therefore adapts to the variations in the air flows. Such a turbine, until now installed on aircraft and not on the ground, is known as a backup wind turbine and as a Ram Air Turbine or RAT.

According to another particular advantageous characteristic, said means of recovering energy is an air turbine convertor without a propeller that adopts an electrostatic technology. This technology is particularly interesting in the outputs that it proposes and in the little amount of maintenance that it requires due to the absence of moving parts.

According to another particular advantageous characteristic, said means for recovering energy is a turbine without a propeller.

By positioning in relation to the ground in a judicious manner the means for recovering at a certain distance from the lateral walls of the train and at a certain height in relation to the height of the train, a substantial quantity of energy is recovered instantly.

The passage of the train over a line sets into motion a certain mass of air. This mass of air when encountering the means of recovering sets into rotation the propellers of the turbine when it is provided with them or sets into motion particles that are electrostatically charged. The rotation of the propellers or the actuating of the convertor produces direct current and voltage. The energy produced is stored by the storing module which in turn supplies the camera and the communicating module. The device of the invention as such has a means of power supply which provides it both with the required power and the desired autonomy regardless of the weather conditions. According to a preferred embodiment, said turbine is arranged to position its axis horizontally.

It is understood that such a device has a minimal installation and operating cost with regards to the functionality proposed due to the fact in particular that it is not necessary to create a wired link between the terminals.

In addition to the fact that it is self-powered, such a device has many advantages, among the following:
permanent video surveillance of all of the lines regardless of the weather and this both day and night,
real-time detection of any deterioration in the rails, grid or catenary linked to malevolent acts, inclement weather or normal wear and tear over the entire lines,
real-time detection of any presence of objects, animals or people on the rails and catenaries over the entire high-speed lines,
a mapping at any time of the positioning of the high-speed trains over all of the tracks giving the possibility of increasing the number of trains placed in circulation.

According to another characteristic, the wireless communicating module comprises one or several antennas making it possible to carry out two networks:

a main permanent communications, transfer, data and distribution network of the images of the image-capturing module via internet connecting via a wireless connection,
the terminals together,
one or several terminals to at least one internet point of access and at least one terminal to the train
an autonomous local temporary network overcoming a failure in the permanent main network and able to allow for the distribution of the images captured by the image-capturing means between each terminal and the train and from one terminal to the other. The device of the invention as such provides a degraded operating mode when the main network may have a failure.

In order to allow for setting it up adequately along the tracks, the means for recovering is linked to a fixed portion integral with the ground and in relation to which its position can be adjusted. As such, according to a particularly advantageous characteristic of the invention, said terminal comprises a mast sealed to the ground provided with a stem at the end of which is arranged the means for recovering. Likewise, according to other characteristics that are associated or not, said stem has a length that can be adjusted and is linked to the mast in such a way as to be able to be adjusted in height. These different possibilities for adjusting the position of the means for recovering prevent an excessive precision for the positioning of the masts. These different possibilities for adjusting especially make it possible to position in such a way as to use the air displaced by the train as best as possible. According to another characteristic, the mast comprises at its upper end, the module for communicating and the image-capturing module and, at the low end, a base for sealing to the ground.

According to a preferred embodiment, the railway line provided with the device is a high-speed line which allows for a more substantial air displacement for the operation of the means for recovering.

In addition, according to another preferred embodiment, the terminals are arranged at regular intervals.

The image-capturing module can be constituted by any means for acquiring an image. As such, according to an embodiment the image-capturing module is constituted by a photographic device. According to another embodiment, the image-capturing module is constituted by a camera.

According to a particularly advantageous characteristic, said image-capturing module is a long-range thermal camera.

Thermal technology allows the lighting conditions to be overcome. The long range makes it possible to provide an interval of great length between the terminals constituting the monitoring network.

According to another particular advantageous characteristic, the module for storing electrical power uses one or several of the following solutions:
electrical batteries,
a reversible fuel cell,
means of producing and storing compressed air.

This module will enable the storing of the power which is produced only on a one-off basis during the passing of the train.

According to another particular advantageous characteristic, the communicating module comprises a wireless communicating device of the Wi-Fi type which allows for communication between terminals and/or with the train. In addition to providing a possibility of communication for the monitoring device, the setting up of a Wi-Fi network in the vicinity of the tracks has many advantages. The device of the invention makes high-speed track-to-train permanent Wi-Fi connections (up to 300 MB/s) available to all of the trains running on the lines. Such a characteristic improves the comfort of all of the passengers with the making of Wi-Fi connections available to them that can be free for all of the classes. To do this, the train is then provided with a Wi-Fi communications module.

According to another particularly advantageous characteristic of the invention, the train is provided with a terminal inside the cockpit on which the images recorded by the image-capturing modules are displayed. Such a characteristic makes it possible to consider innovative monitoring methods consisting in communicating to the terminal the images deemed suspicious (by comparing with prerecorded images) with their geographical location.

Of course, the train is then provided with a Wi-Fi communications module.

Likewise, another method consists in continuously communicating to the terminal the images captured by the image-capturing means arranged upstream and at a distance greater than or equal to the braking distance of the train. Another method consists in displaying on the terminal of a first train, the images of another train that preceded it or that is travelling in the opposite direction. Monitoring the railway track does not exclude the images captured by the terminals of the railway track at the time when the other trains pass or those of the trains themselves travelling on them. The continuous monitoring proposed by the invention allows for this communication.

An alternative consists in showing the train driver over long distances, the train that preceded it or the train coming in the opposite direction, which makes it possible to reduce the risk of collision between trains in certain zones of railway tracks. Such methods indeed make the operation of the railway track networks much safer.

The fundamental concepts of the invention that has just been disclosed hereinabove in their most elementary form, other details and characteristics shall appear more clearly when reading the following description and with regard to the annexed drawings, given by way of a non-restricted example, several embodiments of a device in accordance with the invention.

DESCRIPTION OF PREFERRED EMBODIMENTS

Figure 1:
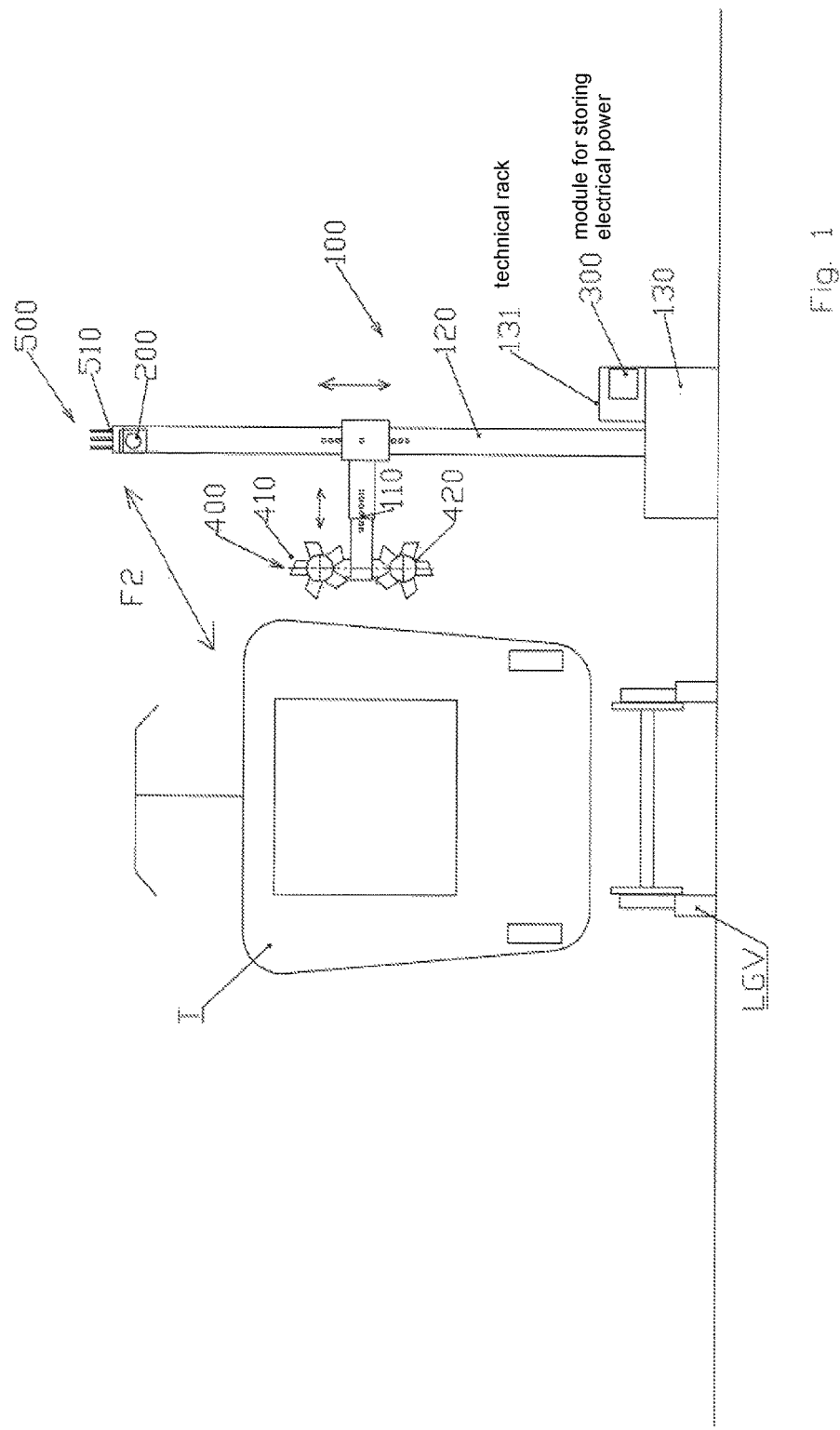
FIG. 1 is a diagrammatical drawing of a front view of an embodiment of a device in accordance with the invention with a train passing in the vicinity.

As shown in the drawings of the figures, the device of the invention provides the monitoring of the high-speed line referenced as LGV. This device has the form of a plurality of monitoring terminals 100 arranged at regular intervals along the railway track and dividing said LGV line into monitoring sections of a defined length.

In accordance with the invention, these terminals 100 comprise:
a camera 200,
a module for storing electrical power 300,
a module for producing power 400 supplying the storing module 300, and
a wireless communicating module 500 of the Wi-Fi type, referred to as a Wi-Fi module that authorizes the terminals 100 to communicate between them.

The terminals are independent and communicate only through the Wi-Fi network created by the terminals. According to a preferred embodiment, the sections are of two kilometers. Also, the camera is of the long-range thermal type.

According to a preferred embodiment, said thermal camera is of the very long range type, has a protective index of the IP67 type, and is provided with a GPS and a system for geolocating objects that appear in its field of vision with respect to the terminal and an automatic tracking and zoom system. These features are managed by a central unit.

The Wi-Fi module forms with those of the other terminals, a point-to-point Wi-Fi network using very long-range Wi-Fi bridges. As such, the Wi-Fi antennas will transmit the images recorded by the cameras of each terminal to each terminal of the line. One of the terminals is advantageously linked to the internet network.

This camera and this Wi-Fi module are continuously supplied with power by the storage module 300.

In order to supply said storage module 300, the module for supplying 400 is constituted by at least one dynamic air turbine which, arranged in such a way as to be subjected to the air displaced by the air caused by the displacement of the high-speed train T, produced energy to be stored by the storing module 300. A type of dynamic air turbine that can be used for this type of application is conventionally used on aircraft as a backup source of electricity in the event of a general electrical failure. This turbine resists very severe climatic conditions (temperature from −50° C. to +80° C., high wind speeds that can reach 200 m/s). According to another embodiment not shown, said turbine or turbines are of the type without propellers.

According to a first evaluation, the electrical consumption of the terminal (adding that of the Wi-Fi bridge, the long-range camera, accessories and taking losses into account) is estimated to be 1 KWH per day. However, based on the number of passes of high-speed trains equal to 10 with an average speed of 200 km/h, the electrical energy production of the turbine or turbines is evaluated at 2 KWH per day. Such a device therefore largely provides the power required for the functions under consideration and makes available a free and ecological autonomous power source at any point of the high-speed line.

Figure 3:
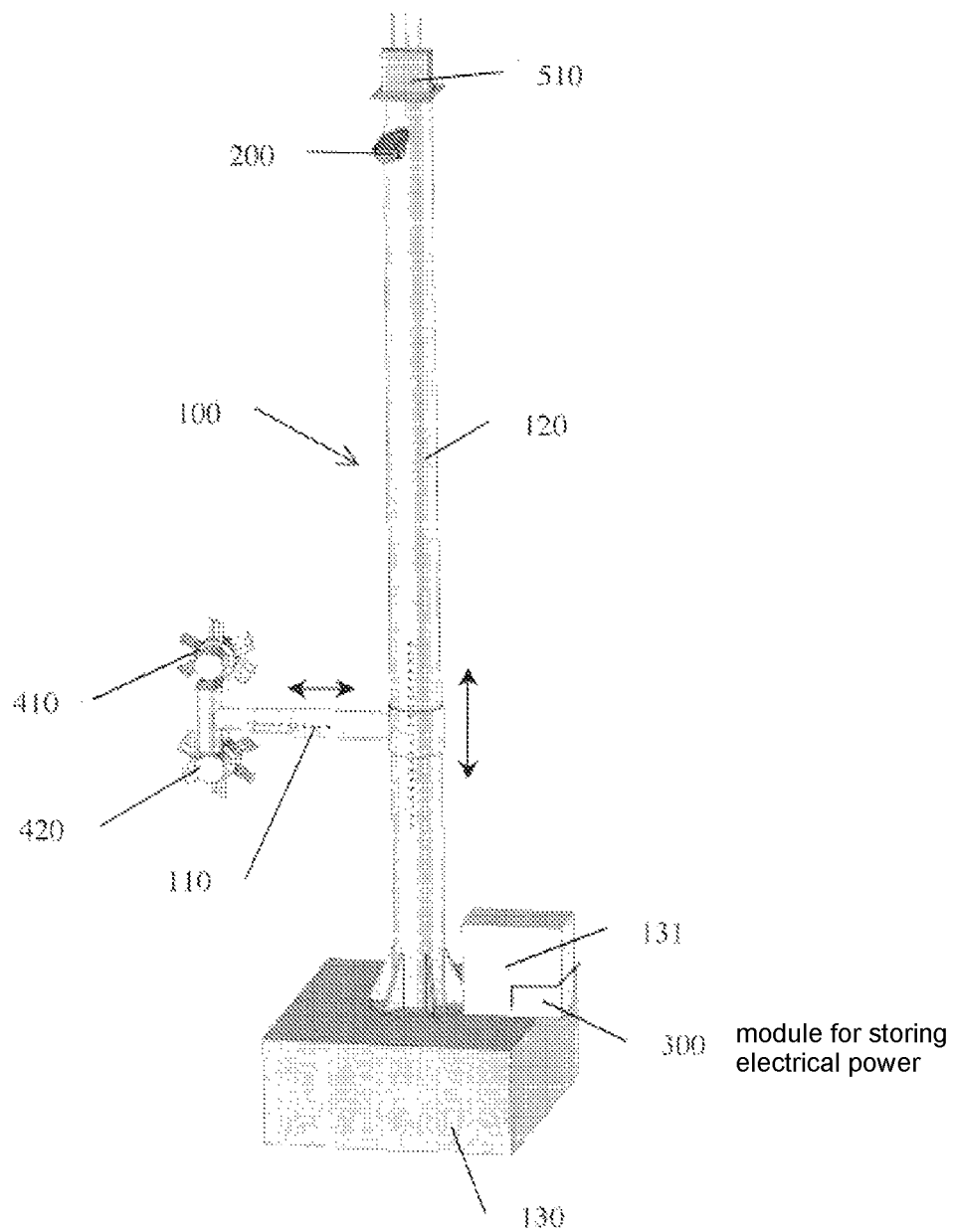
FIG. 3 is a diagrammatical drawing in perspective of an embodiment of a terminal.

According to the embodiment shown in the drawing of FIG. 3, the mast 120 comprises at its upper end, the module for communicating 500 and the camera 200 and, at the low end, a base 130 for sealing to the ground. Said terminal 100 is here provided with two turbines 410 and 420 with parallel and horizontal axes of rotation constituting the module for producing energy 400. These two turbines 410 and 420 are positioned at the end of a horizontal arm 110 forming a stem in relation to a vertical mast 120 of which the low end is provided with a base 130 that is sealed to the ground and of which the top end receives the antenna 510 of the Wi-Fi module and the camera 200.

As shown, in order to use in an optimized way the displacement of the air provoked by the passing of train T the position of the turbines can be adjusted on the one hand, by adjusting the length of the stem 110 and on the other hand, by the adjusting of the height of the stem along the mast 120.

The base 130 also receives a technical rack 131 that contains the electronic box of the long-range Wi-Fi module, a network switch, a central unit, and the module for storing electrical power.

According to a preferred embodiment, this storing module 300 is constituted by batteries. According to another embodiment, this storing module is constituted by a reversible fuel cell. According to another embodiment, this storing module is constituted of a means for storing compressed air.

Figure 4:
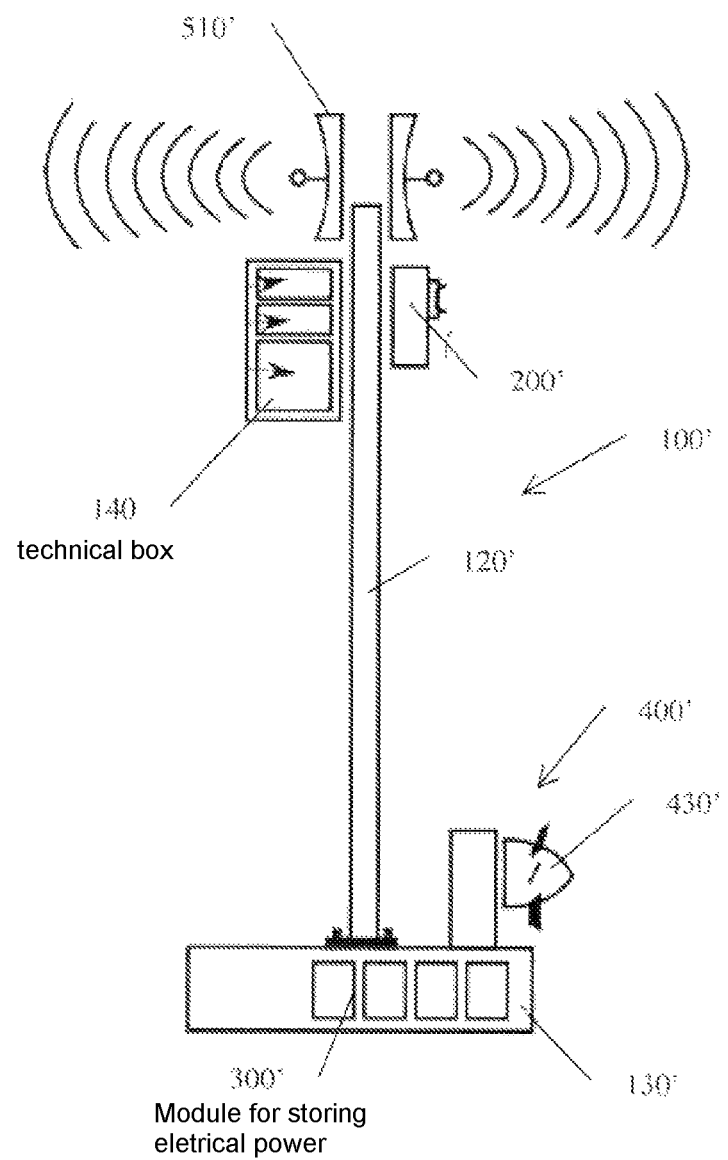
FIG. 4 is a diagrammatical drawing of another embodiment of a terminal.

According to the embodiment shown in the drawing of FIG. 4, the terminal 100' comprises a mast 120' at the top end of which are positioned:
the antenna 510' of the long-range Wi-Fi bridge,
the long-range thermal camera 200', and
a technical box 140 receiving the electronic box of the long-range Wi-Fi bridge, a network switch, a central unit.

The low end of the mast 120' is associated to a base 130' that receives the module for producing energy 400' constituted by a single turbine 430'. This base 130' also receives the module for storing electrical power 300' produced by the turbine 430'.

Figure 2:
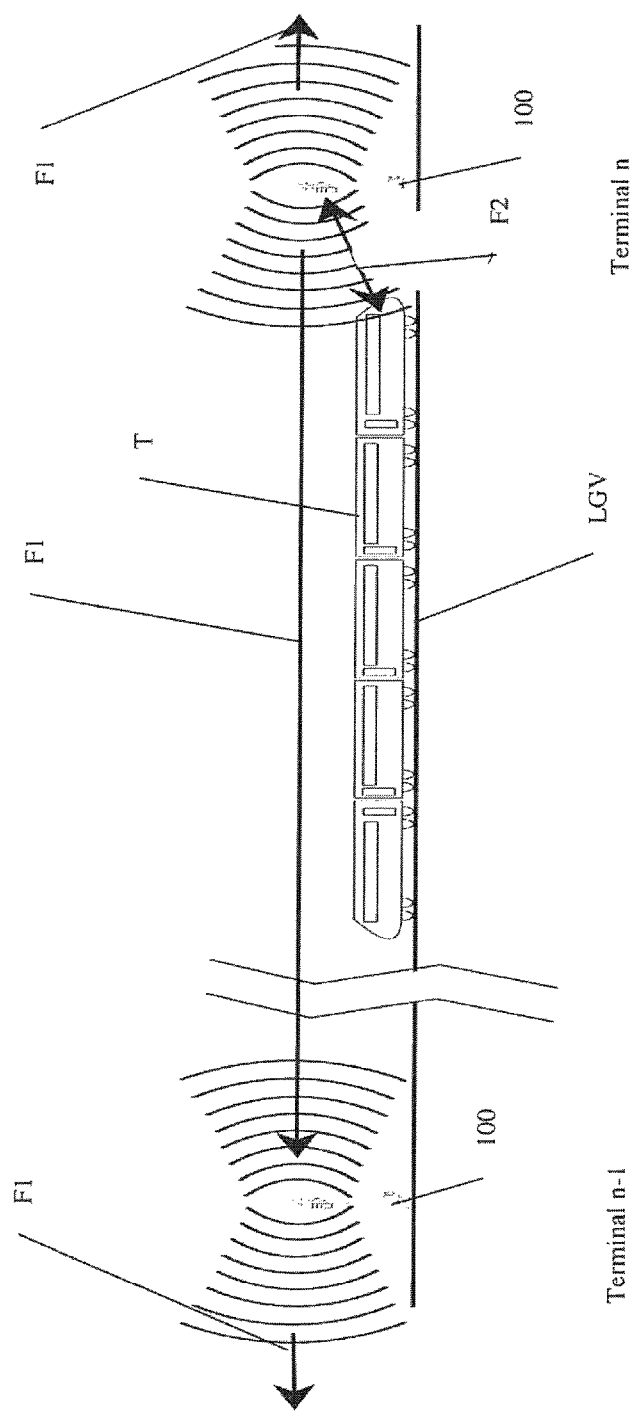
FIG. 2 is a diagrammatical drawing of a side view of the device of FIG. 1.

As shown in the drawing of FIG. 2, the Wi-Fi module enables not only the communication between terminals 100 (arrow F1) but also with the train (arrow F2). The connection via the Wi-Fi module is provided by a long-range antenna mounted on the train and compatible with the network on the ground which is a point-to-point network constituted by the terminals 100. Each terminal of the network is geographically identified and communicates with the neighboring terminals in order to make it possible for the train conductor to have a monitoring image library within the critical radius of action with regards to safety. This network is not a centralized network. It is a collaborative point-to-point network. Each node constituted by each terminal 100 has an autonomous central unit able to identify the disturbances and alert the users of the system. The train is itself provided to form a communication node.

According to an embodiment, the device constitutes a private network of the intranet type making it possible to exchange safety information (images, position of the trains, etc.).

According to another embodiment, in order to allow the passengers to have Wi-Fi access, the network is interconnected to Internet in a "sealed" manner in order to distinguish over this network, the flow of safety data encapsulated in encrypted packets and the "general public" flow. The interconnection is carried out by conventional low-cost high-speed terrestrial connections of the ADSL type installed for example in the stations, making sure however that high-end services are used with high quality in terms of reliability and with high bandwidth.

In the framework of monitoring, the train is provided with a terminal built inside the cockpit on which the images recorded by the cameras and transmitted by the Wi-Fi network are displayed. As such, an operating method of the device for monitoring consists in communicating to the terminal the images deemed as suspicious (change in the scene observed compared to a history library) with their geographical location. Another method consists in continuously communicating to the terminal the images captured by the cameras arranged upstream and at a distance greater than or equal to the braking distance of the train.

Figure 5:
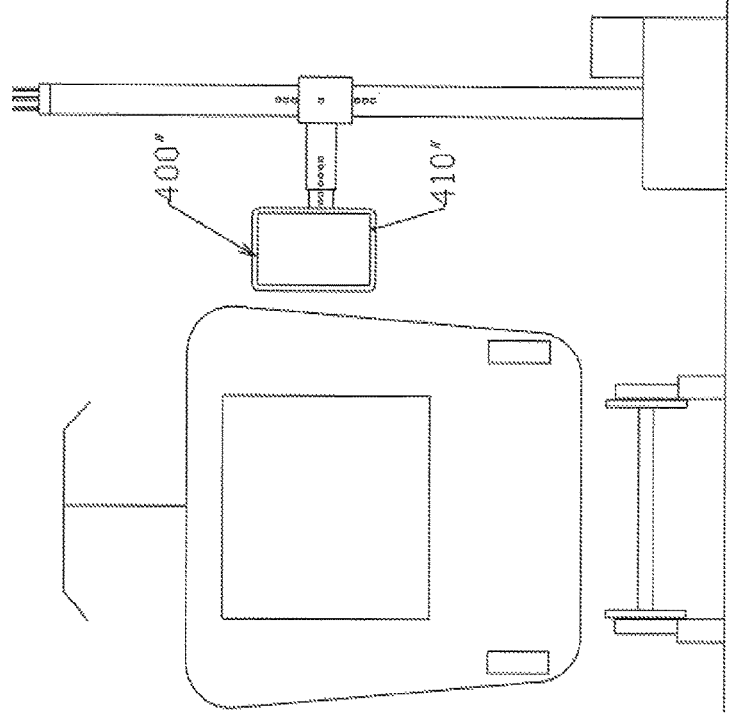
FIG. 5 is a diagrammatical drawing of a front view of another embodiment of a device in accordance with the invention with a train passing in the vicinity.

FIG. 5 shows an embodiment wherein the means for recovering energy 400" is constituted by an air turbine convertor without propeller that adopts an electrostatic technology where inside a frame 410" is created a field of charged particles which will be displaced by the air displaced by the train.

It is understood that the device and the method, that have just been described and shown hereinabove, were described and shown for the purposes of disclosure rather than as a limitation. Of course, various arrangements, modifications and improvements can be made to the example hereinabove, without however leaving the scope of the invention.

The invention claimed is:

1. A device for communicating with human users of a TGV train and monitoring railway tracks along a TGV train line, the device being self-powered, the device comprising a plurality of communicating and monitoring terminals arranged at regular intervals along the tracks and dividing the TGV train line into monitoring sections of a defined length, with each of the terminals comprising:
an image-capturing module comprising a long-range thermal camera configured to monitor trains on the tracks,
a wireless communicating module that allows for communication between the terminals and with the human users of the train,
a module configured to store electrical power continuously supplying the image-capturing module and the communicating module,
a power-generating module configured to supply power to the module for storing electrical power comprising a means configured to recover the energy from the air displaced by the train running over the railway track, configured to permanent monitor by capturing images and making permanent wireless connections and images from the image capturing module available to the human users of the trains, the power generating module providing the power required by the communicating module and the module for storing electrical power;
the device further including a terminal built inside the cockpit of the train on which the images recorded by the cameras and transmitted by the Wi-Fi network are displayed;
the plurality of terminals being spaced along the tracks;
wherein the electrical power consumption of each module is about one kilowatt per day.

2. A device according to claim 1 wherein the means of recovering is a dynamic air turbine.

3. A device according to claim 1 wherein the means of recovering power is a wind turbine Converter without a propeller that adopts an electrostatic technology.

4. A device according to claim 1 wherein the wireless communicating module comprises an antenna making it possible to carry out two networks:
a main permanent Communications, transfer, data and distribution network of the images of the image-capturing module via internet connecting via a wireless connection, the terminals between them,
a terminal to an internet point of access and a at least one terminal to the train,
an autonomous local temporary network overcoming a failure in the permanent main network and able to distribute the views captured by the image-capturing means between each terminal and the train and from one terminal to the other.

5. A device according to claim 1 wherein the module for storing electrical power comprises:

electrical batteries,
reversible fuel cell, or
means for producing and storing compressed air.

6. A device according to claim 1 wherein the terminal comprises a mast sealed to the ground provided with a stem at the end of which is arranged the means for recovering.

7. A device according to claim 1 wherein the stem has an adjustable length.

8. A device according to claim 1 wherein the stem is linked to the mast in such a way as to be adjustable in height.

9. A device according to claim 1 wherein the module for communicating comprises a wireless communicating device of the Wi-Fi type that allows for communication between terminals or with the train.

10. A device according to claim 9 wherein the train is provided with a terminal built inside the cockpit on which the images recorded by the image-capturing modules are displayed.

11. A device according to claim 1 wherein the turbine is of the type without a propeller.

12. A device according to claim 1 wherein the mast comprises at its top end, the communicating module and the image-capturing module and, at the low end, a base for sealing to the ground.

13. An operating method of a device according to claim 1, the operating method comprising communicating to the terminal, the images deemed as suspicious by comparison with prerecorded images with their geographical location.

14. An operating method of a device according to claim 1, the operating method comprising in continuously communicating to the terminal, the images captured by the image-capturing modules arranged upstream and at a distance greater than or equal to the braking distance of the train.

15. An operating method of a device according to claim 1, the operating method comprising displaying on the terminal of a first train, the images of another train that preceded it or travelling in the opposite direction.

16. A device according to claim 1 wherein the regular intervals are two kilometers in length.

17. A device according to claim 1 wherein the image-capturing module comprise a GPS.

18. A device according to claim 1 further comprising Wi-Fi bridges.

19. A device according to claim 1 wherein the electrical power consumption of each terminal is less than the electrical power generation by each module.

20. A device according to claim 1 wherein the train is moving.

* * * * *